United States Patent [19]

Casperson

[11] 4,425,144
[45] Jan. 10, 1984

[54] RECOVERY OF CARBON BLACK

[75] Inventor: John R. Casperson, Bartlesville, Okla.

[73] Assignee: Phillips Petroleum Company, Bartlesville, Okla.

[21] Appl. No.: 293,064

[22] Filed: Aug. 17, 1981

[51] Int. Cl.³ .............................................. B01D 46/04
[52] U.S. Cl. ........................................ 55/96; 55/98; 55/291; 55/283; 55/296; 23/314; 210/272
[58] Field of Search ................. 55/96, 97, 98, 99, 283, 55/291, 302, 296, 300, 474, 479, 487; 23/314; 210/269, 271, 272

[56] References Cited

U.S. PATENT DOCUMENTS

| | | | |
|---|---|---|---|
| 2,995,204 | 8/1961 | Prostshakov | 55/320 |
| 3,041,808 | 7/1962 | Snyder | 55/262 |
| 3,108,858 | 10/1963 | Jamison, Jr. | |
| 3,410,055 | 11/1968 | Zenz | |
| 3,594,991 | 7/1971 | Berz et al. | 55/302 |
| 3,798,882 | 3/1964 | Kalen | |
| 3,854,902 | 12/1974 | Kalen | |
| 3,868,237 | 2/1975 | Berz | 55/283 |
| 4,295,867 | 10/1981 | Shopin et al. | 55/96 |
| 4,338,104 | 7/1982 | Merry | 55/479 |
| 4,348,361 | 9/1982 | Johnson | 55/302 |

FOREIGN PATENT DOCUMENTS

| | | | |
|---|---|---|---|
| 2038553 | 5/1972 | Fed. Rep. of Germany | 55/350 |
| 2293962 | 8/1976 | France | 55/291 |
| 45-14639 | 5/1970 | Japan | 210/272 |
| 778537 | 7/1957 | United Kingdom | 55/97 |
| 2067918A | 8/1981 | United Kingdom | 55/479 |
| 582812 | 12/1977 | U.S.S.R. | 55/283 |
| 584881 | 12/1977 | U.S.S.R. | 55/282 |

Primary Examiner—Bernard Nozick

[57] ABSTRACT

A layer of particles of carbon black is used as a filtration medium in the separation of carbon black from a gaseous stream containing carbon black.

10 Claims, 11 Drawing Figures

FIG. I

RECOVERY OF CARBON BLACK

This invention relates to the production of carbon black. In one aspect, this invention relates to the recovery of particles of carbon black from a gas containing those particles. In another aspect, this invention relates to a filtration system having a filtration medium comprising carbon black and having a mechanical filter cake removal device.

BACKGROUND OF THE INVENTION

Carbon black is conventionally produced by the thermal decomposition of an oil. Hot combustion gases are first formed in a reactor by the burning of a fuel in the presence of a free oxygen containing gas. These gases are then used to heat and decompose the oil that is injected into the reactor. The decomposition of the oil forms carbon black. The carbon black so formed must be recovered from a residual stream of gases that are admixed with the carbon black. Prior to attempting to recover the carbon black, the reaction can be quenched by introducing a stream of water into the downstream region of the reactor.

Various techniques have been utilized to recover carbon black from the reaction off gas stream. For instance, filtration of the reaction off gas more or less separates the particles of carbon black from the gaseous effluent stream.

The carbon black particles, however, are very fine. Particle or aggregate size in the carbon black reactor effluent typically range from about 0.05 to about 1 microns. Any satisfactory filtration system must recover nearly all of the carbon black from the gas stream prior to release of the gas stream to the environment or use of the gas stream in energy recovery equipment.

In the prior art, various arrangements of filtration apparatus and filtration mediums have been employed to separate particles of carbon black from a carrying gas stream. Perforated or porous ceramic or metal sheets, beds of sand, wire mesh, etc., have been used alone or in combination with fabric filters. Fabric filters such as bag filters made from synthetic fibers, metal fibers, glass fibers and natural fibers such as cotton or wool are well known in the art.

The filtration medium allows the gas to pass through the filter but retains the particles of carbon black. The deposits of the particles create a filter cake which is a layer of particles of carbon black on the filtration medium. Typically the filter cake is nearly completely removed from the various filtration medium by first taking the filter out of service and then adding a back flow of gas or by washing the filter with a back flush of water. The reverse flow of fluid dislodges almost the entire filter cake of carbon black particles. The filter is then put back in service, another filter cake is built from deposits of carbon black particles and eventually the reverse flow portion of the cycle used to dislodge the entire filter cake is repeated. It is important to note that filtering efficiency is drastically reduced prior to the build-up of new cake. Typically the particles of carbon black which form the filter cake are recovered by allowing them to fall from the filtration medium by gravity to a basin. The carbon black is removed from the basin by devices such as belts, mechanical conveyors, augers, pneumatic conveying, etc. The carbon black is subsequently directed to a recovery device, such as to a pelletizer. There it is admixed with a pelletizing agent such as water to form pellets. These pellets are then dried to remove the added water and are recovered as the final product.

Although there has been considerable improvement in the filtration and recovery of carbon black, there is still room for improvement as many serious problems are encountered in the use of prior art processes. For instance, with some prior art filters, the repeated back flush-filtration cycle decays and deteriorates the filtration medium. Bag filters for example have a useful life that is measured by the number and frequency of reverse or backflush flows.

With certain prior art filters, the carbon black particles penetrate the pores of the filtration medium in such manner that they cannot be easily removed by reverse flows of fluids. This results in an unacceptable pressure drop across the filter system. In prior filters having a filtration media of sand, for example, the pores formed by the spaces created between individual particles of sand and form a labyrinth path which the particles of carbon black dust follow. The very fine long particles of carbon black penetrate the bed of sand along these relatively large channels that are formed between the individual particles of sand. The fine carbon black will eventually be entrapped in one of the smaller interstices, if the bed of sand is of sufficient depth. Particles of carbon black then build up within the sand and eventually must be removed to prevent an extremely large pressure drop across the sand filter. A reverse flow of a gas or liquid alone is not always successful in removing the entraped particles. Complete fluidization of the entire bed of particles of filtration medium is not always practical.

THE INVENTION

It is thus one object of this invention to provide an effective means of recovering particles of carbon black from a gas containing those particles.

Another object of this invention is to provide a filter which is suitable for filtering a gas containing particles of carbon black and which does not develop an excessive pressure drop.

Still another object of this invention is to provide a filter from which entrained particles of carbon black can easily be removed in order to restore the filter to an acceptable pressure drop.

A still further object of this invention is to provide a system for filtering a gas containing carbon black and simultaneously recovering the carbon black so obtained as pellets.

These and other objects, advantages, details, features, and embodiments of this invention will become apparent to those skilled in the art from the following detailed description of the invention, the appended claims, and the drawings in which, FIG. 1 shows a filter having a filtration medium comprising a layer of particles of carbon black, and having a mechanism to regenerate the filter, and having a mechanical means of removing the carbon black from the filter.

Figure 1:
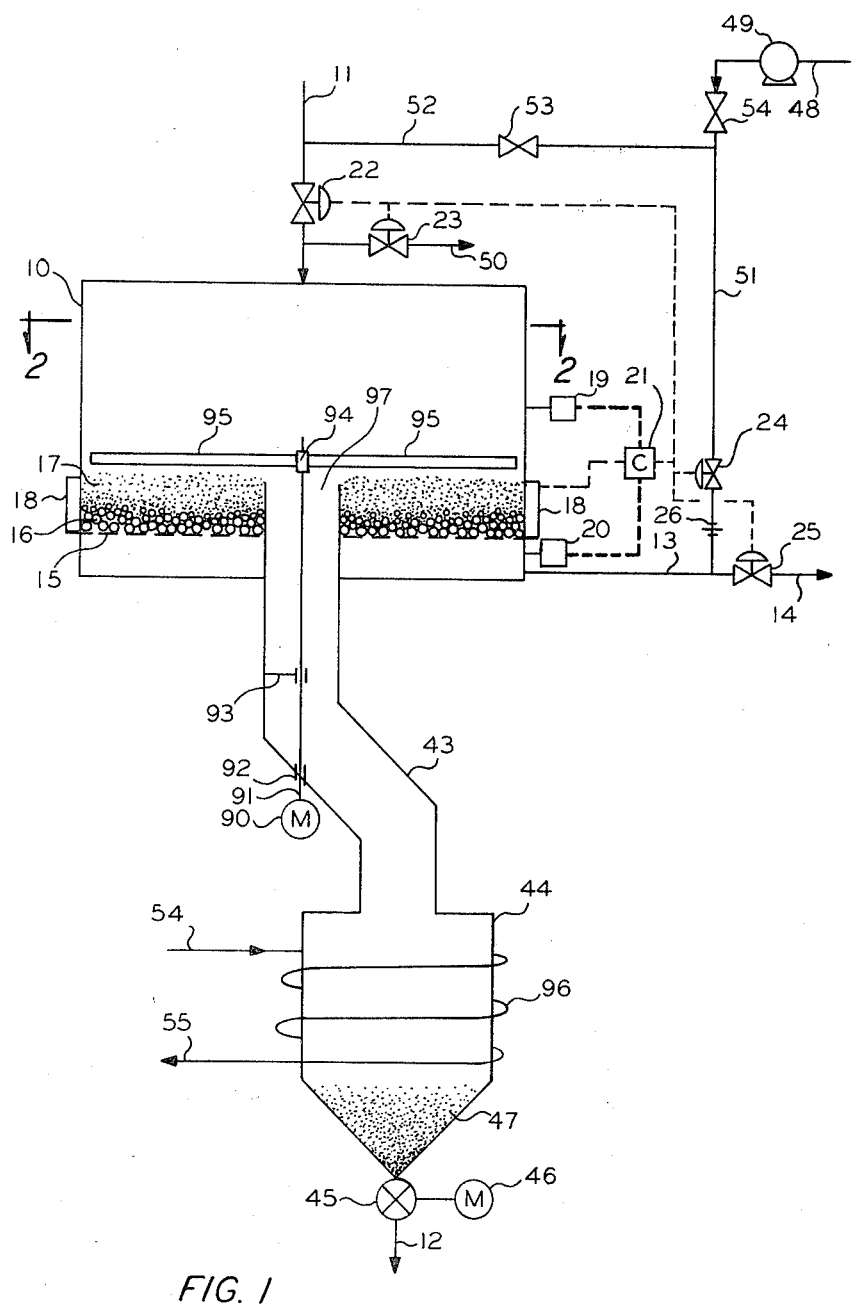

In accordance with this invention, deposits of particles of carbon black on a primary or basic filtration medium can be used as a secondary filtration medium. The secondary filtration medium is preferably a porous bed of particles of carbon black. This porous bed of particles of carbon black can be advantageously used as a specific filtration medium for filtering other particles of carbon black from reaction off gases containing those particles. A portion of the secondary filtration medium comprising carbon black can be removed and recovered as product. A portion can be retained as a secondary filtration medium. Also, the size or amount of the porous bed of particles deposited on the primary filtration medium can be controlled in order to control the pressure drop across the filtration system.

In accordance with an embodiment of this invention, a porous layer of particles of carbon black is deposited or formed upon a basic filtration medium. A gaseous stream containing carbon black can be passed into a filtration chamber and through a primary filtration medium. A layer of carbon black can be formed upon the primary filtration medium. The gaseous stream containing carbon black can be passed through the layer of carbon black to remove additional carbon black from the gaseous stream containing carbon black. The layer of carbon black formed upon the primary filtration medium can be adjusted to a desired depth upon the primary filtration medium by removing a portion of the carbon black from the layer of carbon black to leave a layer of carbon black of a predetermined thickness to form a secondary filtration medium. The porous layer of carbon black in contact with the basic filtration medium can thus be used as a secondary filtration medium in addition to the primary filtration medium. That is, the porous layer of carbon black can be used to filter the reaction off gases containing other carbon black particles.

The basic filtration medium which is used to give form to or support the layer of carbon black can be any filtration medium comprising a loose aggregation of individual elements or particles which can be flowable. Preferably there is no significant adhesion between individual particles which form the basic filtration medium. Sand particles of various grades and sizes, for example, can be used as a basic filtration medium. Generally sand particles of uniform size can be used to obtain a maximum porosity. Also, the basic filtration medium can be a loose aggregation of beads or flakes of the various glasses, metals, ceramics, or synthetic materials such as polymers. For example, beads or flakes of polyphenylene sulfide can be used. The basic filtration medium can also be loose fibers or pieces or particles of fabric or cloth from fibers made from natural or synthetic compounds. Particles or fibers of poly(1,1,2,2-tetrafluoroethylene) or of glass can be desirable as a basic filtration medium. The primary filtration medium should have a support. Loose sand, glass beads, etc. are preferably supported by a perforated plate, a fabric, wire mesh, a screen, etc. Fabric retainers can be made of solid fibers of glass, metal, polymers, etc. Poly(1,1,2,3-tetrafluoroethylene) is a preferred polymer for retainer use. Thus, the nonself-supporting basic filtraton mediums can be placed upon a near horizontal retainer. The primary filtration medium can be amorphous or can be selected so that it does not hold its shape in any direction. For example, particles of the primary filtration medium can be substantially horizontally arranged within the filtration chamber and/or positioned upon the retainer in such manner that upon tilting the retainer from a substantially horizontal position the particles of primary filtration medium flow from the retainer. The retainer can have apertures sufficiently small to prevent the passage of the particles of the basic filtration medium. Combinations of various types of supports and basic filtration mediums can be used.

In one variation of this embodiment, a support for a loose primary or basic filtration medium can generally be placed near horizontally in a near circular filtration chamber or basin. The terms "near circular" and "near horizontally" used in the specification and claims mean that reasonable deviations from a perfectly horizontal or circular configuration are within the scope of this invention. A loose particulate filtration medium such as sand can then be placed upon the support. The filtration medium is preferably distributed across the support until it forms a layer of near uniform height. Gases from a carbon black reactor that contain particles of carbon black can be passed through the filtration chamber and through the basic filtration medium. At least a portion of the particles of carbon black are separated from the gas by the basic filtration medium and eventually form a layer of carbon black particles upon the basic filtration medium. This porous layer of carbon black acts as a filtration medium and filters the subsequent reaction off gas flow. As the layer of particles of carbon black builds up to a certain level, a portion of the layer of particles can be removed and this portion can be recovered as product. A portion of the layer of particles of carbon black can be left upon the basic filtration medium to provide further filtration of the gaseous stream.

A layer of particles of carbon black can be an ideal filtration medium for filtering carbon black from a gaseous stream containing the carbon black. Generally, because of design limitations or pressure drop reduction concerns, conventional filters such as fabric filters allow emission or passage of carbon black particles until a layer of particles of carbon black builds up on the filtration medium. When a layer of particles of carbon black builds up, emissions cease until the filter is cleaned. Upon cleaning, typically only a few or no particles of carbon black remain on the filtration medium. Unlike prior art filters, the filtration system of the present invention preferably has present and utilizes a layer of particles of carbon black as a filtration medium. Thus, no build up period is required and emissions are minimized or avoided.

Furthermore, by use of particles of carbon black as a filtration medium alone or in conjunction with other filtration mediums such as sand, glass beads, etc., higher filtration chamber operating temperatures can be obtained. Conventional fabric filters are generally limited to temperatures below 180° C. With the filtration system of the present invention, operating temperatures in excess of 200° C. can be obtained.

In accordance with this variation the basic filtration medium can be left undisturbed during the removal of part of the layer of particles of carbon black. Processes in the prior art generally attempt to completely remove from the filtration medium all or more than 90 percent of the filter cake. In this variation of this invention, a layer of particles of carbon black having a height or depth in the range of about 1 to 7 cm is preferable withheld in, on or near the top portion of the layer of the basic filtration medium. That is, preferably less than 90 percent of the filter cake is removed in any single removal step. The layer of particles of carbon black retained upon the primary filtration medium can thus be used as a secondary filtration medium. The layer of the particles of basic filtration preferably has a depth or height above the support or retainer in the range of about 1 to about 20 cm. The particle size of the basic filtration medium can be in the range of about 0.1 mm to 4 mm diameter. Basic filtration medium having a particle size of about 0.5 to 1.5 mm is preferred.

In another embodiment of this invention, the porosity of a bed of a primary or basic filtration medium can be maintained by agitating the bed during a regeneration step. Fine particles of carbon black which may permeate the bed of the basin filtration medium can be removed. This reduces the pressure drop that occurs when fine particles of carbon black are entrapped within the bed and build up to an unacceptable level.

In one variation of this embodiment, the individual components of a bed of a basic filtration medium which is used as a support for a bed of carbon black particles can be shaken and/or vibrated. A near oscillating, back and forth motion can be provided by mechanical or pneumatic vibration means located in proximity to, in contact with, or attached to the filtration chamber or filtration medium. The vibration means can impart a movement to the individual elements of the filtration medium. A control means such as a digital controller or a relay logic unit can regulate the agitation of the bed. For example, the control means can cause the agitation means to operate for a predetermined period of time. A movement of the individual elements of the filtration medium, i.e. individual sand particles, glass beads, etc., can free or release entrained particles of carbon black. Compact masses of carbon black are generally less dense and smaller than individual elements of a basic filtration medium such as sand or glass beads. Upon agitation or mixing, the particles of carbon black can tend to rise to a position above a more dense filtration medium such as sand, glass, beads, etc. The more dense basic filtration medium which is substantially freed of entrapped carbon black can tend to settle near the retainer for the bed of basic filtration medium and beneath the layer of the lighter carbon black. Unlike prior processes, the bed of basic filtration medium preferably is not fluidized. The layer of particles of carbon black however can be fluidized. In addition if desired, the layer of the basic filtration medium can be fluidized. Fluidization can occur by rapid or violent agitation or by means of a back flow or back flush of a fluid such as water, air, unfiltered reaction off gas containing particles of carbon black, filtered reaction off gas having a reduced carbon black content, etc.

By "fluidization" or "fluidize" as used in the specification and claims is meant that the volume of a given unit volume of particulate matter which is an aggregation of individual elements increases only in the range of about 1 to 10 percent. Preferably the volume does not increase more than about 2 to about 4 percent.

In another variation of this embodiment, a reverse flow of a fluid is used in conjunction with a moving or vibrating bed of filtration medium to free particles of carbon black entrapped within interstices formed between the individual elements of a basic filtration medium. The flow of flush or regenerating fluid is passed through the bed of filtration medium in a direction opposite to the normal or standard direction of flow of the gaseous stream from which particles of carbon black are to be separated. The gas stream used as back flush can be a compressed or pumped flow of a filtered reaction off gases, unfiltered reaction of gases, air, or other suitable gaseous flow. The gas flush stream can be fed beneath the vibrating filtration bed. The gas may be distributed evenly across the bed by use of a distributing means such as a perforated tubular header means. Division of the back flow of gas into smaller streams avoids excessive motion of the individual elements of the basic filtration medium. The gas flow is typically set at a rate which when used with a vibrating bed preferably does not fluidize the bed of basic filtration medium. The layer of carbon black particles can either be fluidized or not.

In another variation of this embodiment, the pressure drop across a filtration system is controlled. A filtration system has a gaseous stream to be filtered flowing a standard direction through the filtration system comprising a primary and a secondary filtration medium. That is, unfiltered gas normally flows in only one direction through the chamber. The pressure in the filtration chamber is measured at a point above all of the filtration mediums. The pressure in the filtration chamber below all of the filtration mediums is also measured. The pressures can be measured at a suitable physical location of the filtration chamber such as on the sides, the walls, top, or bottom of the chamber. The difference between the pressures indicates the pressure drop across the filtration mediums. When a filtration medium is relatively new or has been regenerated, by a flush or reverse flow of fluid the pressure drop can be relatively low. The differential pressure also can be measured by conventional single cell instruments which measure differential pressure. The sensors sense when the pressure drop approaches a specific or undesired value. Signals indicating the pressure drop can be directed to a control means having an output. This control means can be a digital logic unit such as a computer or a relay network. The control means can also be conventional proportional-, integral-, derivative-mode, analog controller. The output from the control means can be directed to a series of valves. When the pressure drop across the filtration system is relatively high, the controller can direct the closing of a valve that is located in a conduit carrying unfiltered reaction off gas to the filter chamber. This step stops addition of gas containing particles of carbon black to the filter chamber. The control means can simultaneously or in sequence direct the closing of a valve that is located on a conduit containing the filtered off gas stream leaving the filtration chamber. In this manner, the filtration chamber has no unfiltered gaseous flow entering it for purposes of filtering the unfiltered stream nor any filtered gaseous flow leaving it. The control means can then direct vibrators or agitators located in proximity to or connected to the filtration chamber to operate. These impart a motion to the particles of primary and/or secondary filtration medium. The controller can also direct a valve on a conduit containing a back flush fluid stream to open. In preferably the same series of control steps, the control means can cause the opening of a valve which is a vent for the back flush fluid flow that has passed through the filtration medium. The back flush flow can also be a repressurized stream of filtered gas. Repressurization of the filtered off gas can be by pump, fan, compressor, etc. Other pressurized streams of fluids such as water, hydrocarbon, inert gases, furnace flue gases, etc. can also be used as a back flush flow. A back flush flow can be directed through a flow control means such as orifice or a flow control valve which regulates the amount of back flush flow used to manipulate the filtration medium bed. In this manner, operation of the valves by a control means in a proper sequence causes the proper motion of individual elements of the basic filtration medium and of the layer of the particles of carbon black. The basic filtration medium which has been used in filtration and has developed a pressure drop can then be adjusted so that it contains fewer entrained particles of carbon black and a lower pressure drop. Once the pressure measuring instrument or instruments sense a lower and acceptable pressure drop, the control means interprets the signal to indicate that the basic filtration medium has been regenerated. The control means then closes the back flush flow and vent valves, and opens a valve in a conduit carrying unfiltered reaction off gases to the filtration chamber and also opens a valve in a conduit which directs filtered off gas from the filtration chamber. The control means can also then cause the operation of the vibrators to cease. The control means can also cause the operation of the vibrators and the reverse flow of fluid to occur for a predetermined period of time and/or until the pressure above the filtration mediums and the pressure below is at or near a specific value.

In another embodiment of this invention, the level of the porous layer of carbon black particles that is formed upon the basic filtration medium is controlled by mechanical device. The filtration housing can have basin which can provide at least one exit for particles of carbon black which are filtered from the reaction off gas stream and removed from the layer of particles of carbon black formed upon the basic filtration medium. Preferably, a near centrally located removed conduit extends through the retainer for the basic filtration medium and the layer of particles of carbon black and can serve as a basic or an exit conduit from the filtration chamber. Particles and masses of carbon black from the portion of the layer of the filter cake to be removed can then be directed through the exit conduit and can be recovered as product. In one variation, a guide means is used to direct carbon black from the filter chamber to the exit conduit. The guide means can be a stream of fluid flow such as a gas or liquid flow. The guide can be a mechanical guide. The guide means can be a blade, comb, rake, etc. The guide means can be connected to a power means by means of various gears, shafts and other known means of connection. The power means can cause movement of the guide means across, in, on, or near the layer of particles of carbon black. The particles are preferably conducted along or in the directon of movement of the guide toward the exit conduit. The exit conduit can direct the particles of carbon black to a bin. This bin serves as a reservoir to store the particles of carbon black for subsequent removal to a pelletizing operation or other product recovery system. The bin or reservoir is preferably maintained at the same pressure as the filtration chamber. The bin can be fitted with a product removal valve such as a slotted gate valve, an oscillating ball valve, or a star valve. These valves can be used to direct flow of particles of carbon black from the bin without depressurizing the filtration chamber and bin. A power source can cooperate with the product removal valve to control the rate of removal of carbon black. In this manner a static head of unfiltered gases from the carbon black reactor is maintained within the exit conduit and the storage bin. The temperature and the pressure in the exit conduit and the bin can be maintained at a value equal to or nearly equal to the pressure and temperature in the filtration chamber.

In one variation of this embodiment of this invention the guide means comprises a plurality of arms or protusions extending from a cog or shaft located near centrally within the filtration chamber. These protusions can be shaped in such manner that they cup or hold the particles of carbon black and direct them advantageously from the layer of particles of carbon black toward the exit conduit.

In another variation of this embodiment, a pump means such as an auger, screw pump, crank, etc. can be used as a guide means. One preferred type of mechanical pumping device is a screw type mechanical pump having helical grooves shaped like the threads of a screw. These grooves are formed by near helical blades or fins attached to an elongated shaft. The blades can extend in continuous or in discreet segments from near one end of the shaft of the mechanical pump toward near the other end. A housing can surround the mechanical pump in such manner that a near helical passageway is formed. The mechanical pump and housing can be positioned within the filtration housing, substantially parallel to the layer of particles of carbon black. The housing of the mechanical pump can have an inlet opening into which particles of carbon black can be drawn by the rotation of the mechanical pump within the housing and a near horizontal movement of a pump and housing across, in, on, or into a layer of particles of carbon black. The pump can be rotated within the housing by an external power means such as an electrical motor connected to the pump shaft via various intermediate gears, joints, shafts, etc. The pump and housing can be supported at the one end by means of a roller, gear, wheel etc. that is connected to the shaft and that moves upon a suitable track. The track can extend in a near circular path around the periphery of the filtration housing or basin. A clear path for the roller, etc. can be maintained and the track can be kept clean of particles of carbon black by means of a brush mounted to the ends of the pump housing or by means of a fluid jet which flushes the track clean. The position of both ends of the pump and the pump housing and the track relative to the layer of particles of carbon black above the basic filtration medium can be adjusted by moving the unit or individual items along a measured path. This can be done for example by positioning the track upon movable supports. The power means, the pump housing, and the track thus can be moved up and down, and in lateral and other desired directions. As the pump is rotated within the pump housing, the pump housing and the pump can be revolved within the filtration chamber. The power means connected to and driving the pump can be directed to the shaft of the pump to the supporting roller, gear, etc. positioned on the track and fixed near the feed or inlet portion of the pump housing. One end of the pump housing can be connected to the exit conduit in such manner that the exit conduit can be the axis around which the pump and pump housing rotate. The space between the exit conduit pivot point and the pump housing can be sealed by maintaining a positive fluid pressure in the exit conduit, by conventional mechanical seals, or by packing. As the pump and pump housing are rotated, particles of carbon black can be carried or pumped from the inlet opening of the housing along the near helical passageway within the grooves of the pump. The particles are directed toward an exit opening of the pump housing to the exit conduit which extends through the filtration bed and support. Particles can then be released from the force of the pump and can be directed by another conveying device or by gravity to the storage bin. Particles can be held in the storage bin until needed for pelleting operations.

In another variation of this embodiment, the feed or inlet end of the pump housing can be fitted with an extension which protudes from the pump housing in the direction of movement of the pump housing and pump near horizontally within the filtration chamber. This extension can be metal, wood, or plastic, or other structurally sound material. The extension acts as a scoop to direct particles of carbon black into the feed end of the pump housing. The angle of this protusion with respect to the pump housing can be adjusted. By adjusting this angle, the depth that the extension penetrates into the bed of particles of carbon black can be controlled. This adjustment in turn controls the amount of carbon black fed into the pump housing and removed from the filtration chamber. This determines the level of the bed of particles of carbon black above the basic filtration medium.

In another variation of this embodiment, particles of carbon black can be directed by a guide blade toward the extension connected to the housing of a pump means. The guide blade can be connected to a point near the axis of the filtration chamber, and can move or revolve the filtration chamber. The guide blade and a pump means can be positioned in proximity to the bed of particles of carbon black formed upon a primary filtration medium or in proximity to the primary filtration medium. The guide blade can be rounded or flat and be made out of any suitable material. The guide blade can have any shape such as that of a blade, comb, rake, rod, pin, etc. The guide blade can extend near horizontally to the filtration bed from a point near where the exit end of the housing of the pump means connects to the exit conduit. As the pump means and pump housing revolve around the axis of the filtration chamber, the guide blade likewise can revolve around the axis of the filtration chamber as the pump means and the guide blade move in proximity to the layer of particles of carbon black, a portion of the particles of carbon black is moved or directed by guide blade toward the inlet zone of the pump means. The rotating guide thus leads the pump and pump housing and shapes or plows a pattern into a layer of carbon black particles. The guide blade shapes a portion of the layer of particles of carbon black in such manner that a portion of the carbon black is directed from the filtration bed toward the inlet or feed portion of the pump housing. Thus the guide blade aids in the control of the level of the layer of the particles of carbon black above the basic filtration medium by assisting in the feeding of the pump.

In still another embodiment of this invention, a pelleting means is located within the filtration chamber. A pelleting housing within a filtration can thus serve as a chamber for the pelleting of carbon black. The particles of carbon black produced by the various furnace or tangential reactors or other known modes of making carbon black can be relatively fine. Fine particles are dusty and are difficult to handle unless they are shaped into the form of a pellet. Fine particles can be introduced within a filtration chamber into the pelleting means in their flocculent state. A pelleting housing can be used as a pelleting means. Particles can be fed in to the inlet of the pelleting housing by means of the movement of the pelleting housing and various guides in, on, adjacent or near the layer of particles of carbon black above the basic filtration medium. The particles of carbon black can be dry pelleted. That is, they can be shaped into pellets by means of the pelleter in the absence of a pelleting agent such as water. The particles within the pelleting housing are preferably contacted with a pelleting agent. Pelleting agents such as water, oil, aqueous molasses solution, polyethoxylated amines, and/or combinations of these or other known pelleting agents can be used. The pelleting agent can be added to the pelleting housing or other mixing device located within the filtration housing. A network of conduits can be used to carry a pelleting agent in to the filtration chamber and to the pelleting housing. A rotating joint can be located near the center most point of the filtration housing upon the exit portion of the pelleting housing. This rotating joint can serve as the pivot for the addition of a pelleting agent to the filtration housing. From the pivot point, conduits may transport the pelleting agent to the various positions along the pelleter housing. The rotation of a mixing device such as a pump or mixing pins within the pelleting housing can combine and admix the added pelleting agent with the particles of carbon black to produce pellets suitable for handling with a minimum of dust problem.

In one variation of this embodiment, a combined pump-pin mixer can be utilized in the pelleting of carbon black. A portion of the blades or fins of the pump can be removed from the shaft of a pump. The blades or fins can be replaced by pins or rods. A series of pins or rods can project from the shaft in a near helical or other suitable pair. The pins or rods can be spaced to provide mixing of the pelleting agent with particles of carbon black. The pins or rods can be spaced to provide a pumping and transporting motion to the pellets so formed. The feed portion of the pump can have blades or fins having a continuous, near helical surface. The mixing portions of the device can have the discreet sets of pins or groups of pins. These can be arranged to give a desired mixing pattern.

In still another variation of this embodiment, a pin-mixer may be used to transport particles of carbon black out of filtration chamber and to pellet particles of carbon black. The part of the mixing device and/or pump having blades or fins can be replaced with an elongated shaft having pins or extending therefrom. The shaft can be coaxially surrounded by housing. The pins can be so arranged in such proximity in the feed housing surrounding the shaft that portions of the carbon black are admixed with the pelleting agent and can be pumped along the housing toward the exit conduit, i.e. as the shaft revolves, the particles of carbon black can be conveyed toward the exit zone housing by the pin arrangement.

The following description contains further preferred embodiments of this invention, but should not be read in an unduly limiting manner.

FIG. 1 shows a filtration system utilizing a mechanical filter cake removal device. A gas stream containing particles of carbon black flows via conduit 11 into a near cylindrical filtration chamber 10. Filtered gas leaves the filtration chamber 10 via conduits 13 and 14. Particles of carbon black flow through conduit 43 into a storage bin 47. Particles pass through a valve 45 and are directed through conduit 12 from the filtration system. A retainer or support 15 is placed in the near cylindrical chamber 10. A layer of basic filtration medium 16 is placed upon the retainer 15. A layer of particles of carbon black 17 is formed upon the basic filtration medium 16 by the flow of gas containing particles of carbon black through the basic filtration medium 16 and the retainer 15. A motor 90 is connected to a shaft 91 which extends into the exit conduit 43 and via a seal 92 and into the filtration chamber 10. The shaft 91 is positioned in a desired point by support 93. A hub 94 connects to the shaft 91. Guides 95 extend from the hub 94 into the peripheries of the chamber 10. The relative position of the motor 90 with respect to the shaft 91 can be adjusted in order to affect the position of the guides 95 with respect to the layer of particles of carbon black 17. Likewise the position of the hub 94 with respect to the shaft 91 can be adjusted in order to affect the position of the guides 95 with respect to the layer of particles of carbon black 17. The motor 90 rotates the shaft 91 which in turn rotates the hub 94. The guides 95 are rotated in the direction of the rotation of the shaft 91. Particles of carbon black from the layer of carbon black 17 are directed toward the inlet opening 97 of the exit conduit 43. The carbon black then flows via conduit 43 into the bin 44. The bin 44 is in contact with a heating device 96. A flow of a heat transfer medium such as steam via conduit 54 into the jacket 96 surrounding the bin 44 exits via conduit 55. Electrical heating of the bin also can be utilized. Preferably, the bin is heated with filtered off-gases, such as a portion of the gases from the conduit 13. The bin is heated in order to prevent the formation of acid forming compounds as by moisture condensing in presence of carbon dioxide and/or sulfur dioxide. A mass of carbon black 47 from the layer of particles of carbon black 17 is collected within the bin 44. The carbon black passes through the removal valve 45 which is controlled by a motor 46. Valve 45 is preferably selected so as to minimize pressure loss from the system when it is opened and the removal valve 45 can be a rotating ball valve, a star valve, etc. The carbon black so removed is directed from the filtration system via conduit 12. The pressure above the filtration bed is measured by a pressure sensor 19. The pressure below the filtration bed is measured by pressure sensor 20. These measurements which indicate the pressure drop across the filtration bed are directed to a controller 21. When the pressure drop across the bed is above a desired value, the controller 21 closes valve 22 which is located in the unfiltered gas stream conduit 11. This prevents unfiltered gas from entering the filtration chamber 10. The controller also causes valve 25 in conduit 14 containing filtered off gas to be closed. At this point, there is no flow in nor out of the filtration chamber 10. The controller 21 then directs valve 23 on the vent header 50 to open. The vent conduit 50 can be directed to another filtration housing or out of the system. The controller also directs that valve 24 on conduit 51 be open. If valve 53 is closed and valve 54 is open, a gas flow can pass through conduit 48 to a pressure means 49 for increasing fluid pressure such as a pump, blower, compressor, etc. through conduit 51 into conduit 13 and into the filtration chamber 10. This gaseous flow can be used as a back flush flow or reverse flow which imparts movement to the individual elements of the basic filtration medium 16. The back flush flow can also agitate the layer of the particles of carbon black 17. The rate of the back flush flow through conduits 51 and 13 can be regulated via control device 26 such as an orifice. The controller 21 preferably continuously back flows for a predetermined period of time. This period of time can be set in such manner that sufficient regeneration of the filtration bed has occurred. The controller 21 also can direct that an optional vibrator or vibrators 18 affixed to the periphery of the filtration chamber 10 be turned on. The vibrators 18 also impart a motion to a filtration medium or mediums within the filtration chamber 10. After a predetermined regeneration time period has elapsed, the controller 21 shuts off the vibrators 18. The controller then closes valves 23 and 24, and the reverse flow of gas into the filtration chamber 10 will cease. Controller then directs valve 25 and valve 22 be opened. Flow of unfiltered reaction off gas containing carbon black particles into the filtration chamber via conduit 11 then begins. Also flow of filtered gas from the filtration chamber 10 via conduit 13 and 14 begins. The regeneraton cycle of the filtration bed preferably uses filtered gas as the flush fluid. However, if valve 54 is closed and valve 53 is open, then unfiltered gas containing particles of carbon black can be used to agitate the filtration bed via flow through conduits 11, 51, and 13 into the filtration chamber 10, when the controller 21 has determined that valves 24 and 23 should be opened.

Those skilled in the art realize that many variations can be made in the above described embodiment of this invention. For example, during regeneration, the controller 21 can turn off the motor 90. Also, a source of pressured fluid could replace the pressure means 49 as a source of pressurized back flush flow.

Figure 2:
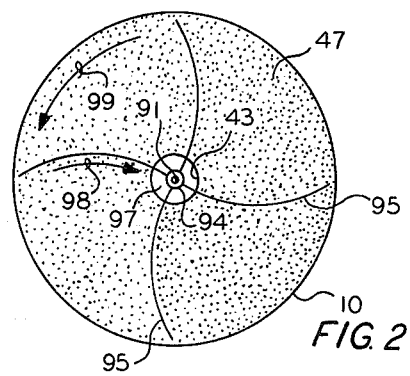
FIG. 2 is a top view of the filter apparatus of FIG. 1.

FIG. 2 shows a top view of the filtration apparatus of FIG. 1 taken along the indicated lines. A shaft 91 extends into the filtration chamber 10 via an exit conduit 43 having an opening 97. A hub 94 connects to the shaft 91. Guides 95 extend from the hub 94 in to the peripheries of the chamber 10. Guides 95 may be given shapes advantageous to collecting, holding, and directing particles or masses of carbon black from the extremities of the chamber 10 toward the opening 97 of the exit conduit 43. As the shaft 91 and guides 95 rotate in the direction of the arrow 99, particles of carbon black from the bed of particles of carbon black 17 are guided by the guides 95 toward the opening 97 of the exit conduit 43, indicated by arrow 98.

Figure 3:
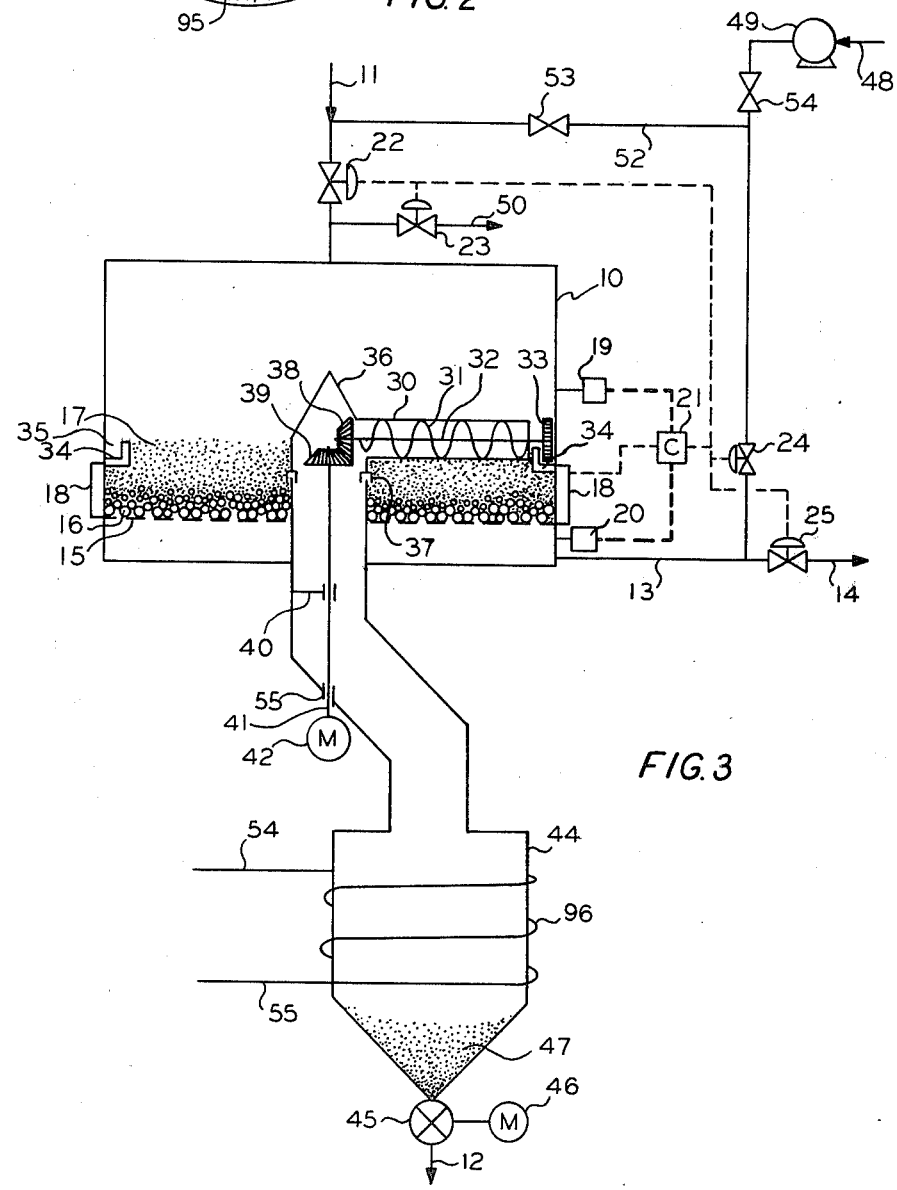
FIG. 3 shows a filtration system having a mechanical pump used to remove filter cake.

FIG. 3 shows a filtration system containing a mechanical pump utilized to remove a filter cake comprising particles of carbon black. The filtration system contains a chamber 10 and inlet and outlet flows and a regeneration system similar to that disclosed in the discussion of FIG. 1 above. A motor 42 is connected to a shaft 41 which extends through a seal 55 into the exit conduit 43. The shaft 41 is supported by a guide 40. A cog or gear 39 is fixed near the end of the shaft 41 and interacts with a second cog or gear 38. The motor 42 imparts motion to the shaft 41 which turns the first cog or gear 39. The first cog or gear 39 imparts motion to a second cog or gear 38. The second cog or gear 38 is connected to a shaft 32 which is integral to a mechanical pump 31. The mechanical pump 31 has blades or fins which are enclosed within a pump housing 30. The shaft 32 has at the end opposite the cog or gear 38 a support means 33. The support means 33 can be a gear, a wheel, etc. A track 34 extends around the periphery of the near cylindrical filtration housing 10. A space 35 is formed between the track 34 and the side of the filtration housing 10. The support means 33 travels in the space 35 upon the track 34. The space 35 can be kept free and clear of particles of carbon black by means of a moving brush (not shown) or an air jet (not shown). The pump housing 30 interconnects with a pivot housing 36. The pivot housing 36 adapts to the exit conduit 43 by means of bearings and/or seals 37. As a motor 42 turns the shaft 41 and the gears 39 and 38 and the support means 33, the shaft 32 of the pump 31 turns the pump within the housing 30 and also revolves the housing 30 and the pivot housing 36 within the filtration chamber 10. Carbon black from the layer of particles of carbon black 17 is picked up by the movement of the pump housing 30 and the pump 31. The carbon black is then carried along within the pump housing 30 into the exit conduit 43.

Figure 4:
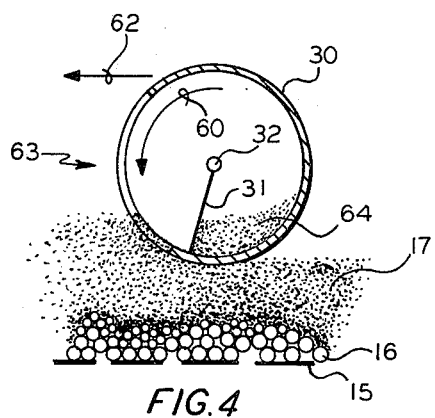
FIG. 4 is a cross-sectional view of a mechanical pump used in the filtration system of FIG. 3.

FIG. 4 shows an end view of a pump suitable for removing a filter cake, comprising particles of carbon black, from a filtration system. A retainer 15 supports a basic filtration medium 16 which supports a layer of particles of carbon black 17. As the pump housing 30 travels in the direction of arrow 62, in, on, or near the layers of particles of carbon black 17, carbon black enters the housing 30 via an inlet or feed opening 63. Particles of carbon black 64 within the housing 30 are picked up and conveyed by the fins or blades of the pump 31 which extend from the shaft 32. The pump can rotate in the direction of the arrow 60. As the pump rotates, particles of carbon black are transported along the pump housing 30 from the inlet or feed opening 63 to an exit opening (not shown).

Figure 5:
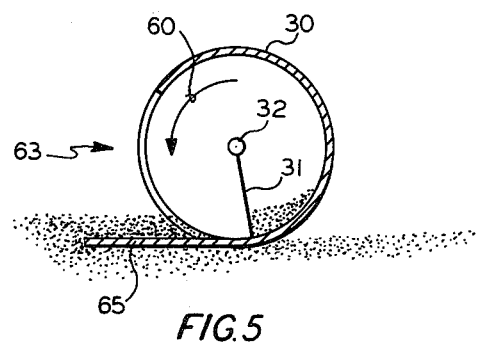
FIG. 5 shows a housing for mechanical pump having a projection used to guide the filter cake into the housing.

FIG. 5 shows a pump 31 having an extension or protusion 65 to the pump housing 30. The extension 65 aids in capture of carbon black from the layer of particles of carbon black above the basic filtration medium. The extension 65 directs and feeds particles of carbon black into the filter pump.

Figure 6:
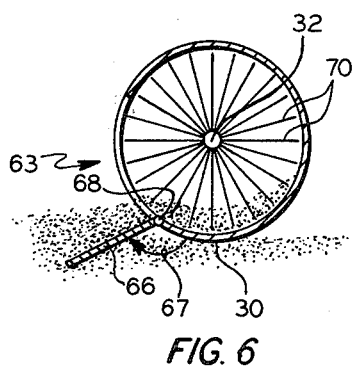
FIG. 6 shows a cross-sectional view of a filter cake removal device having an adjustable filter cake guide and mixing and directing pins or rods.

FIG. 6 shows a pump having an adjustable feed means and a pin mixing and pumping means. A guide 66 connects with the pump housing 30 at a point 68. The connecting point 68 is a hinged or a pivot point. The angle 67 between the pump housing 30 and the guide 66 can be adjusted. The angle 67 can be adjusted to advantageously affect the depth to which the guide 66 extends into a layer of carbon black particles. As the angle 67 decreases, the level of the layer of particles of carbon black below the filtration housing 30 also decreases. FIG. 6 also shows pins 70 extending from the pump shaft 32. The pins 70 can be advantageously spaced to achieve a desired mixing and pumping mechanism.

Figure 7:
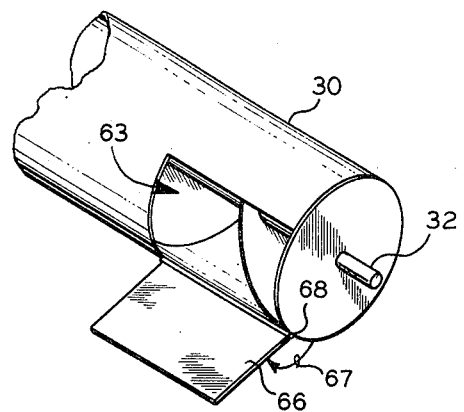
FIG. 7 shows a frontal view of a feed section of a housing, having a filter cake feed guide.

FIG. 7 shows a frontal view of a pump housing having an adjustable feed means. The housing 30 has an inlet portion 63. The guide 66 connects with the housing 30 at a pivot point 68. As in FIG. 6 above, the angle 67 can be adjusted to achieve a desired carbon black feed.

Figure 8:
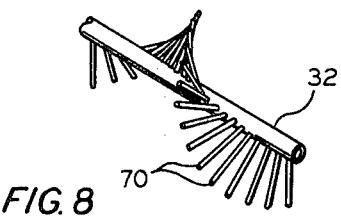
FIG. 8 shows how a shaft having pins suitable for mixing and directing particles of carbon black.

FIG. 8 shows an pictorial view of a pin mixing and pumping mechanism. A plurality of pins 70 extend from the shaft 32. The pins may extend in any desired direction. Also, the pins may be spaced in any desired manner. A near helical pattern is shown here and is preferably used for pumping and mixing uses.

Figure 9:
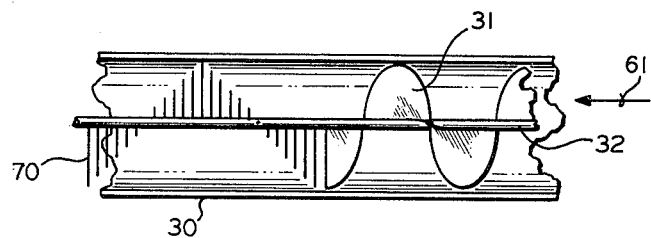
FIG. 9 shows a side view of a combined mechanical pump and pin mixer in a housing.

FIG. 9 shows a combined pump and mixing device. Within the housing 30, a shaft 32 has a pump 31 with blades or fins extending from the shaft. The shaft 32 also has a plurality of pins 70 extending from the shaft. Particles of carbon black preferably flow in the direction of arrow 61. That is, carbon black is first pumped by the blades or fins of the pump 31 along the pump housing 30, and then are contacted with the pins 70. A pelleting agent can be added to any portion of the pump housing 30. The particles of carbon black thus can be picked up by the pump 31 and directed toward the mixing pins 70.

Figure 10:
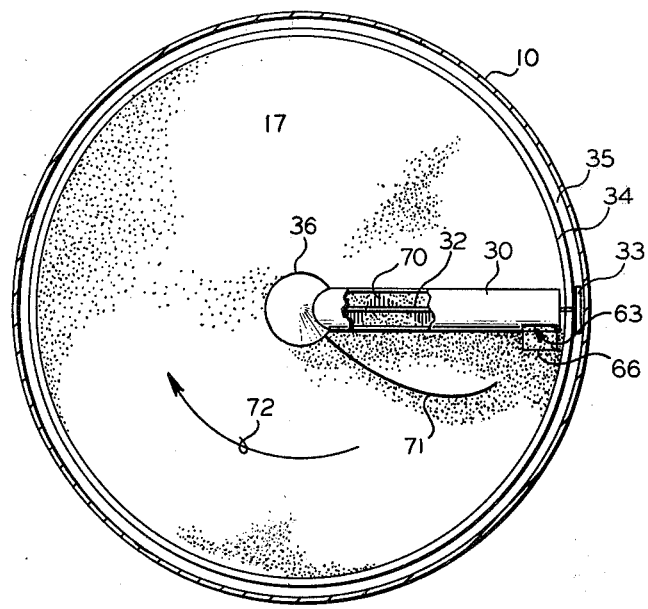
FIG. 10 is a top view of a filter cake removal device having a revolving filter cake guide.

FIG. 10 shows a filtration system having certain features previously discussed and a filter cake feed guide. Within the filtration chamber 10 a pump housing 30 is connected with a pivot housing 36. A feed guide 71 extends from the pivot housing 36. As the pump housing 30 rotates within the filtration chamber 10 in the direction of arrow 72, the feed guide 71 which is located in, on, or near the layer of particles of carbon black 17, directs a flow of carbon black toward the feed or inlet portion 63 of the pump housing 30. Particles of carbon black enter the pump housing 30 over the feed plate extension 66. The feed guide 71 has a shape that is adjustable to achieve an optimum distribution of particles of carbon black which form a pattern suitable for ease of feeding the pump housing 30. The feed guide 71 for example can be made of a resilient metal which can be manipulated by pressure or temperature into a desired shape.

Figure 11:
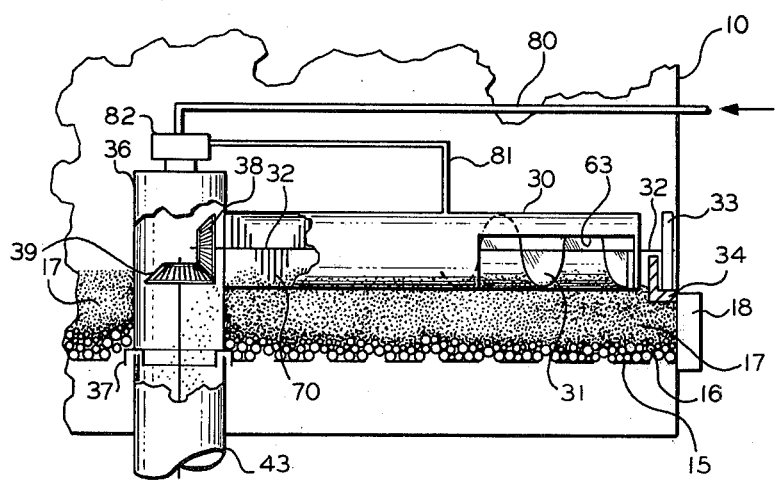
FIG. 11 shows apparatus for adding a pelleting agent to a filter cake removal device used as a carbon black pelletizer.

FIG. 11 shows a filtration system having a pelleting means. A pelleting agent enters the filtration chamber 10 via a conduit 80. The conduit 80 interconnects with a rotating seal 82 that is positioned above the pivot housing 36. Conduit 81 which extends from the rotating seal 82 to the top housing 30 carries the pelleting agent to the pump housing 30. The conduit 80 is stationary with respect to the filtration chamber 10. The conduit 81 is stationary with respect to the pump housing 30 but rotates with the pump housing 30 with respect to the filtration chamber 10. The point at which the conduit 81 connects with the pump housing 30 may be adjusted to achieve a desired mixing effect. Particles of carbon black 17 from the bed enter the opening 63 to the pump housing 30. Pump 31 carries particles of carbon black along the pump housing 30. Particles of carbon black are contacted with the pelleting agent which enters the pump housing 30 via conduit 81. The blades or fins of pump 31 can aid in the mixing of the pelleting agent and the particles of carbon black 17. The pins 70 which extend from the shaft 32 of the pump 31 also aid in the pelleting of the particles of carbon black. The pellets so formed are directed toward the inlet opening 97 of the exit conduit 43. Pellets may be subsequently directed to a storage bin or into a dryer.

Reasonable variations and modifications which will become apparent to those skilled in the art can be made in this invention without departing from the spirit and scope thereof. For example, those skilled in the art recognize that this invention is applicable to the recovery of carbon black from a gaseous stream regardless of the reactor design or reaction scheme used to produce the carbon black. Also, multiple layers of various filtration mediums can be used, rather than just a primary or a secondary filtration medium.

That which is claimed is:

1. In a carbon black production operation, the process of separating carbon black from a gaseous stream containing the carbon black, which process comprises:
   (a) passing the gaseous stream containing carbon black into a filtration chamber and through a filter bed comprising a primary filtration medium, which primary filtration medium comprises a loose aggregation of individual elements or particles,
   (b) forming a lower layer of carbon black upon the primary filtration medium,
   (c) passing the gaseous stream containing carbon black through said lower layer of carbon black formed upon the primary filtration medium to remove additional carbon black from the gaseous stream containing carbon black and depositing such additional carbon black as an upper layer on said lower layer,
   (d) removing as the product of this process said upper layer of carbon black to leave said lower layer of carbon black as a secondary filtration medium and leaving the primary filtration medium undisturbed during this removal.

2. A process in accordance with claim 1 wherein said primary filtration medium is sand.

3. A process in accordance with claim 1 wherein said primary filtration medium is beads of a material selected from the group of solids consisting of glass, metal, and/or polymer.

4. A process in accordance with claim 1 wherein said primary filtration medium is composed of flakes made of a material selected from the group of solids consisting of glass, metal, and/or polymer.

5. A process in accordance with claim 1 wherein said primary filtration medium is loose fibers made of a material selected from the group consisting of glass, metal, and/or polymer.

6. A process in accordance with claim 1 wherein said primary filtration medium is particles of fibers made of a material selected from the group consisting of glass, metal, and/or polymer.

7. A process in accordance with claim 1 further comprising removing said upper layer of carbon black by a guide means which directs carbon black from the filtration chamber.

8. A process in accordance with claim 1 further comprising removing said upper layer of carbon black by a pump means which directs carbon black from the filtration medium.

9. A process in accordance with claim 1 or 2 or 3 or 4 or 5 or 6 wherein said filtration medium is supported upon a retainer.

10. A process in accordance with claim 3 or 4 or 5 or 6 wherein said polymer comprises poly-1,1,2,2-tetrafluoroethylene.

* * * * *

UNITED STATES PATENT AND TRADEMARK OFFICE
CERTIFICATE OF CORRECTION

PATENT NO. : 4,425,144

DATED : January 10, 1984

INVENTOR(S) : John R. Casperson

It is certified that error appears in the above—identified patent and that said Letters Patent is hereby corrected as shown below:

Column 16, Claim 8, line 22, "medium" should be --- chamber ---.

Signed and Sealed this

Twentieth Day of March 1984

[SEAL]

Attest:

GERALD J. MOSSINGHOFF

Attesting Officer

Commissioner of Patents and Trademarks